Oct. 25, 1955

J. L. HEINL ET AL 2,721,684

MACHINE FOR FEEDING AND FILLING
RECEPTACLES FOR PLANT POTTING

Filed Feb. 10, 1953

INVENTORS
J. Lawrence Heinl &
BY William J. Miller

Owen & Owen
ATTORNEYS

Oct. 25, 1955     J. L. HEINL ET AL     2,721,684
MACHINE FOR FEEDING AND FILLING
RECEPTACLES FOR PLANT POTTING Filed Feb. 10, 1953     8 Sheets-Sheet 6

INVENTORS
J. Lawrence Heinl &
BY William J. Miller

Owen & Owen
ATTORNEYS

Oct. 25, 1955    J. L. HEINL ET AL    2,721,684
MACHINE FOR FEEDING AND FILLING
RECEPTACLES FOR PLANT POTTING

Filed Feb. 10, 1953    8 Sheets-Sheet 7

INVENTORS
J. Lawrence Heinl &
BY William J. Miller

ATTORNEYS

United States Patent Office 2,721,684
Patented Oct. 25, 1955

2,721,684

MACHINE FOR FEEDING AND FILLING RECEPTACLES FOR PLANT POTTING

Joseph Lawrence Heinl and William J. Miller, Toledo, Ohio; said Miller assignor to said Heinl Application February 10, 1953, Serial No. 336,104

17 Claims. (Cl. 226—95)

This invention relates to the potting of plants, and particularly to a machine for successively feeding pots to soil-filling position, conveying the soil to and feeding it in measured quantities to successive receiving pots preparatory to inserting plants therein.

The primary object of the invention is the provision of a machine which is operable to perform said operations in a simple and rapid manner, whereby pots may be successively fed to a filling station and there filled with a measured quantity of prepared soil, after which each pot may there receive its plant, be removed from its plant-receiving position and placed on a tray or pallet to be conveyed to another position, all of said operations being performed in an efficient and economical manner without the usual difficulty of clogging of the transported soil.

A further object of the invention is the provision of novel means for successively feeding columns or sets of nested pots to a position where they are individually broken loose from the column and fed to a soil-filling position.

Another object is the provision of simple and novel means for continuously feeding prepared soil to a station where a measured batch is extracted from the continuously flowing stream and the measured batches successively delivered to separate pots preparatory to setting plants therein.

Further objects and advantages of the invention will be apparent from the following detailed description, and from the accompanying drawings illustrating one embodiment thereof, in which—

In the general operation of the machine, a plurality of timed and correlated mechanisms are employed, one of which feeds successive columns of nested pots to a position where loosening of the pots relative to each other occurs and the loosened pots then individually and successively fed to a station where plant is inset by hand and soil is mechanically fed in metered quantity therein, after which each filled pot may be removed from such station and placed in a receiving tray. Another mechanism continuously feeds properly prepared and compounded soil from a source of supply to a station where a measured quantity of soil is delivered to each pot when in filling position and the surplus soil, both from the measuring and the pot-filling stations, is returned to the supply esource. The soil thus moves continuously from and to the source and is never accumulated in a mass from which a measured charge is required to be extracted.

The frame structure for supporting a part of said mechanism is designated 1 and another part is designated 2. These structures are each formed, in the present instance, by uprights 3, upper and lower lengthwise extending stringers 4 and suitably positioned cross-pieces 5, some of which latter connect the two frame structures 1 and 2 which are positioned side by side.

Pot separating and feeding mechanism

Figure 6:
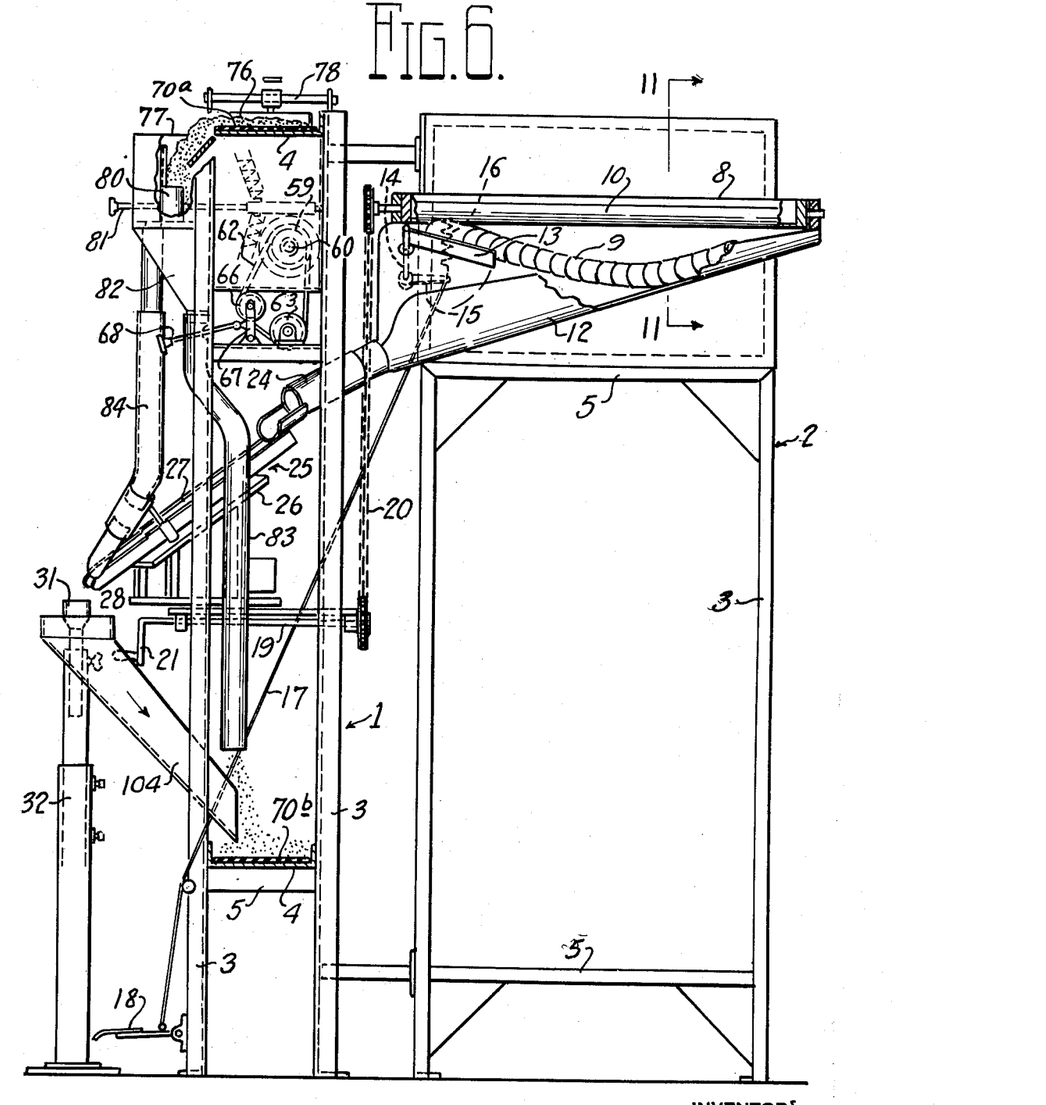
Fig. 6 is an enlarged section on the line 6—6 in Fig. 1, with parts broken away.
Figures 7, 12:
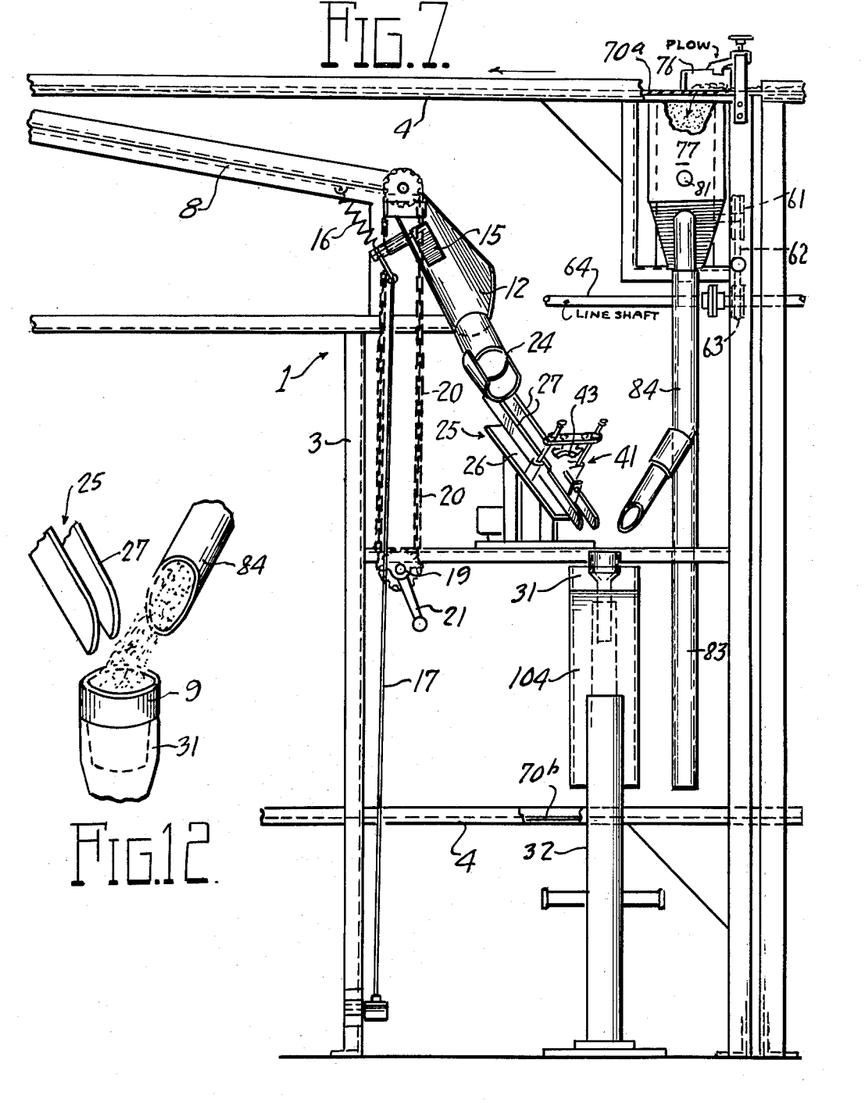
Fig. 7 is an enlarged left hand side elevation of the forward end portion showing the parts disclosed in Fig. 6.
Fig. 12 is a detail showing the relation of a soil-receiving pot to the separate soil and pot delivery means.

This mechanism is mounted partly on the frame structure 2 and includes at the top of said structure an inclined gravity feed table 8 on which a plurality of columns or sets of nested pots 9 are placed in successive parallel rows one against the other, so they will roll down together toward the lower end of the table. In some instances it has been found desirable to provide a definite urging force downwardly on the rows of pots, either in the form of a weighted following roller or in the form of a drag means acting against the lowest pot in each row. Since gravity alone may be sufficient, no other expedient has been shown. At the lower end of the table, there is located a rotatable cylindrical magazine 10 positioned with its longitudinal axis parallel to the lower table edge. One side of this magazine is open, as at 11, so that the foremost nested set of pots 9 will roll into the magazine when the opening is in receiving position, as shown in Fig. 12. When it is desired to discharge the row of pots from the magazine, upon substantially a half turn of the magazine, the set of nested pots therein drops by gravity through said opening and one end falls on and is supported by the upper end portion of an inclined subjacent trough 12 disposed crosswise of the frame structure 2 toward the other frame structure (Fig. 6). The other end of the nested pot set is initially supported by a shelf-like member 13 above the trough 12, so that the set is flexed to loosen the nested engagement of the pots. This action is facilitated by the jar resulting from the sudden stopping of the fall of the end portions of the nested set while the central portion thereof is unsupported. The shelf 13 is pivoted at its outer end to enable it to be swung from engagement with the nested column of pots to permit the pots to then completely fall into the trough 12 in which they resume their aligned position. The shelf 13 is carried by a vertically disposed shaft 14 journaled in the frame 2, and its upper end is projected downward below the shelf and carries an arm 15. The free end of this arm is connected by a coiled contractile spring 16 to a part of the frame to normally hold the shelf in pot-obstructing position. This end of the arm is also connected by a cable 17 to a foot pedal 18 at the lower portion of the frame 1 in convenient position to be depressed by an operator when it is desired to move the shelf 13 to pot-releasing position.

The magazine 10 is removably journaled at its ends in suitable frame bearings and the circumferential shell portion at the sides of the opening 11 serves to coact with the second row or column of nested pots to hold it and the remaining pots against forward movement while the first row of pots is being discharged and until the magazine has been returned to its pot-receiving position. The turning of the magazine is under the control of the opertaor and is effected by the turning of a crankshaft 19 which has a chain-and-sprocket wheel connection 20 with an end shaft of the magazine. The operating crank 21 of the shaft 19 is in convenient position for the operator. The magazine 10 may be changed to suit the size of pots being fed.

Figure 8:
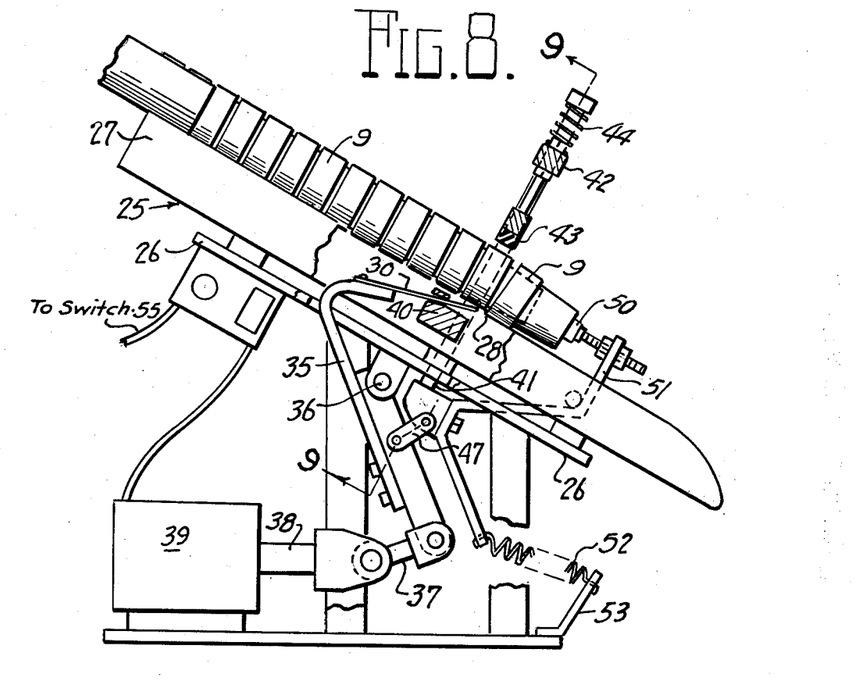
Fig. 8 is an enlarged detail of a portion of the pot feeding mechanism, with parts broken away, and with the pot ejecting finger retracted.
Figure 9:
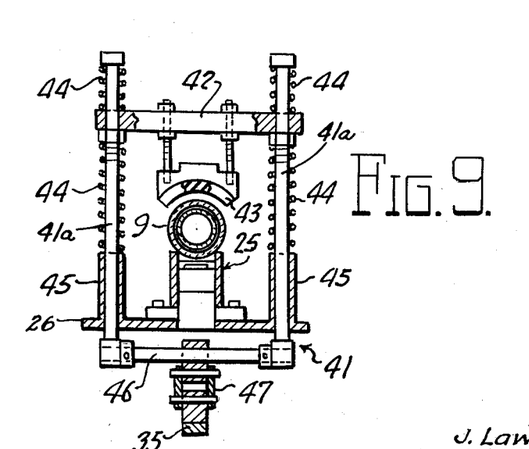
Fig. 9 is a section on the line 9—9 in Fig. 8.

The lower end of the trough 12 terminates, in the present instance, in a downwardly inclined chute 24 through which the loosened column of nested pots 9 passes by gravity to a continuing inclined chute member 25, by which latter it is guided to individual pot-separating and feeding position. This member 25 is supported by a part 26 of the frame structure 1 about half way down on such structure, and comprises two transversely spaced side rails 27 for supporting and guiding the pots. The forward end portions of the rails 27 are stepped downward, with the steps starting at 28 (Figs. 8 and 10), so that each forward pot of the column as it passes from one elevation to the other of the guide rails will have a tendency to tip downwardly and be thereby loosened from the next pot with which nested, as indicated in Fig. 9. This action also lowers the rim of the forward pot relative to the column to facilitate its engagement by an ejecting finger 30, as hereinafter described.

Each ejected pot slides by gravity down and from the forward end portion of the guide rails and is deposited in a subjacent pot holder 31 of a diameter selected for the size of pots being used at a particular time. This holder is of cup-shape and its rim is of suitable diameter to engage the lower shouldered edge of the customary pot rim and to support the pot in filling position with its open end upward. The pot holder 31 is removably supported by a vertically adjustable standard 32, which, in the present instance, has a plurality of telescoped sections.

Associated with the guide rails 27 is a mechanism that controls the successive timed discharge of individual pots therefrom and includes the ejector finger 30. This finger is fixed to and projects forward from the upper angled end of an arm 35, the downwardly projecting end of which is fulcrumed at 36 to the rail support 26 for vertical rocking movements. The lower end of the arm 35 is connected by a link 37 to the armature or plunger 38 of a solenoid 39, whereby upon an energizing of the solenoid the plunger is drawn rearward and an ejecting movement imparted to the finger 30. The movements of this finger are guided by a slotted bar 40 through which it passes and which is disposed between the two guide rails 27.

Surrounding the rim portion of the second pot in order on the rails 27 before ejection of the first pot is a yoke 41 having near its top a cross-bar 42 with a pressure shoe 43 depending therefrom for clamping engagement with the registering rim portion of said second pot upon a lowering of the yoke. The cross-bar 42 is slidingly mounted on the two opposed side rods 41ª of the yoke and is yieldingly held in a neutral position thereon by upper and lower coiled compression springs 44 on each side rod. These side rods slidingly project through guides 45 on the rail support 26 and are connected by a bottom yoke bar 46 (Fig. 9), which in turn is connected by links 47 to the arm 35 below its fulcrum. It is thus apparent that upon each forward or ejecting stroke of the finger 30, the yoke 41 is drawn down to cause the shoe 43 to clamp and firmly hold the second pot during ejection of the first pot.

Figure 10:
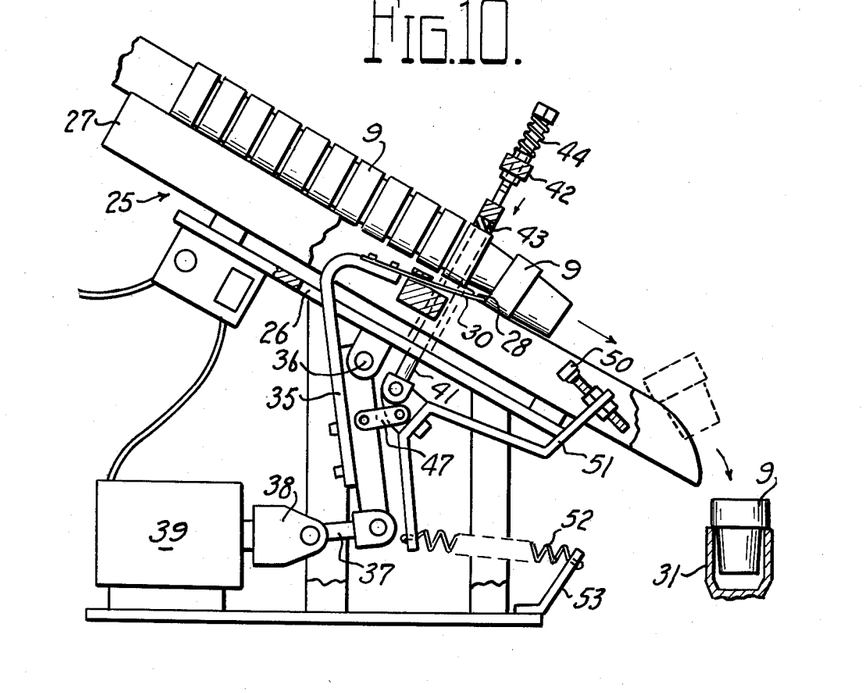
Fig. 10 is a view similar to Fig. 8, showing the advanced pot in a set being ejected for delivery to a receiving holder.
Figure 11:
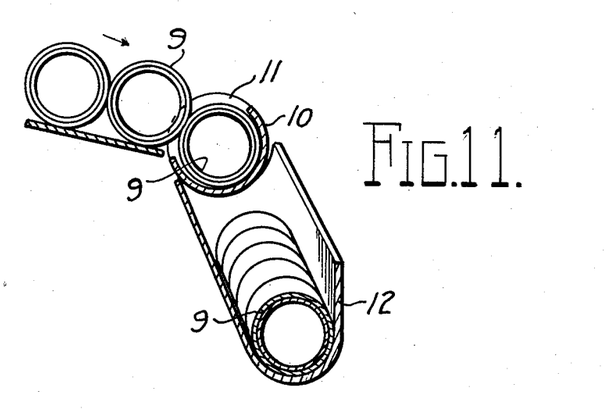
Fig. 11 is an enlarged fragmentary sectional detail of a portion of the pot feeding mechanism taken on the line 11—11 in Fig. 6.

Prior to said first pot-ejecting action, the first or advanced pot in the set on the rails 27 has its forward movement limited by a stop 50 that is adjustably carried at the upper end of angled rocker-arm 51. This arm is attached intermediate its ends to the lower crossbar 46 of the yoke 41, whereby a lowering of the yoke rocks the arm 51 and its stop out of the path of the pot to be discharged as shown in Fig. 10, so that the first pot is free to move down and from the rails 27. A coiled contractile spring 52 connects the lower end of the stop arm 51 to a stationary part 53 and acts to resist solenoid actuated movements of the arms 35 and 51 and the yoke 41, as is apparent, so that the parts will return to the initial pot-stopping position as soon as the solenoid 39 is deenergized.

Figure 3:
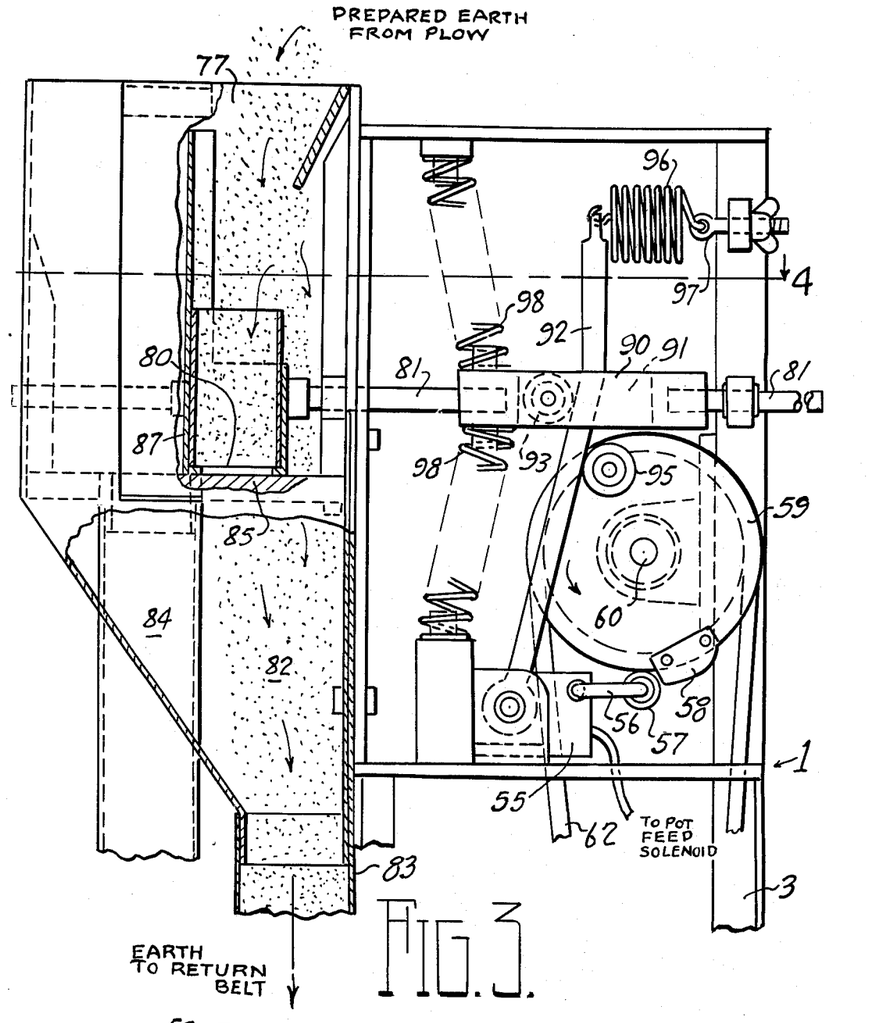
Fig. 3 is an enlarged sectional detail, with parts in full, of the soil measuring means and the operating means therefor, and with the measuring means in soil-receiving position.
Figure 4:
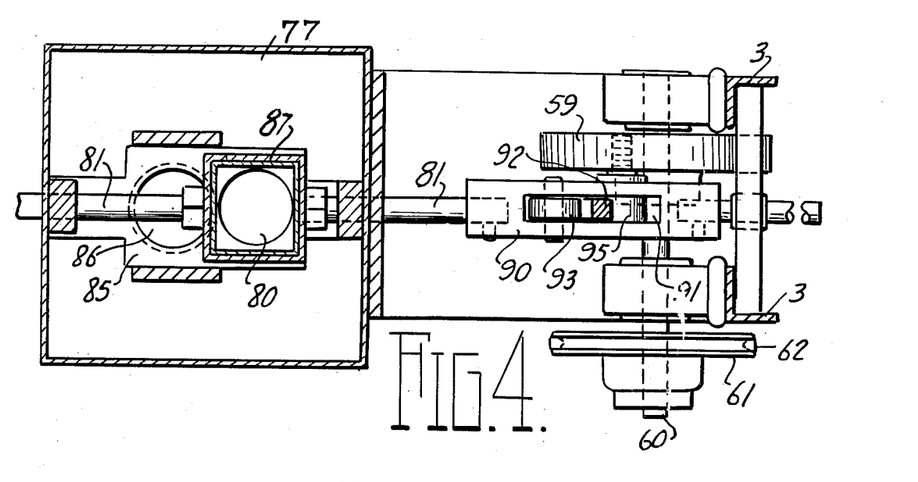
Fig. 4 is a sectional view taken on the line 4 in Fig. 3, with parts removed.
Figure 13:
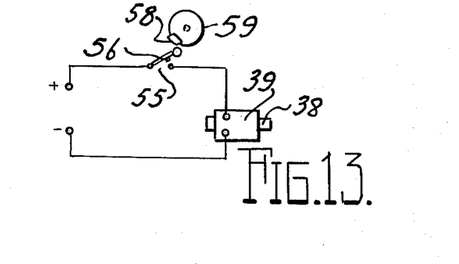
Fig. 13 is a diagram of the solenoid operating circuit.

The solenoid 39 is in circuit with an electric current source and such circuit has a normally open switch 55 (Fig. 13). The movable member of this switch has an arm 56 carrying a roller 57 in the path of a revoluble cam 58 carried at the rim of a wheel 59 (Fig. 3). This wheel is carried by a shaft 60 that is journaled in suitable bearings in the upper forward end portion of the frame part 1. One end of the shaft 60 is provided with a pulley 61 that is connected by a belt 62 to a pulley 63 on a line shaft 64 (Figs. 4, 6 and 7). The line shaft 64 is journaled in the frame structure 1 lengthwise thereof and is driven from a motor 65 (Fig. 1) through suitable connections as hereinafter described. The belt 62 is engaged by an idler pulley 66 (Fig. 6) mounted on a rocker 67 to which a control rod 68 is connected. This rod projects in convenient reach of the operator and is pulled out to tension the belt 62 when it is desired to rotate the control wheel 59 to perform its functions. Thus when the operator wishes to discontinue the feeding of pots, as when leaving the station, it is only necessary to loosen the belt 62 by means of control rod 68.

The parts above described are, as stated, adjustable to accommodate pots of different sizes over a relatively wide range. When a change is to be made, the operator changes first the pot holder 31 in its standard 32 to a unit of the selected new diameter, and then adjusts the stop 50 so that the second pot of the row of the new size will come to rest under the shoe 43. Since the diameter of the new size will be different, as well as the length, the vertical position of shoe 43 must be altered with respect to the crossbar 42 by means of the screw supports shown clearly in Fig. 9.

*Soil feeding and distributing means*

This means includes a main endless belt type conveyor 70 which is guided by a series of rolls 71 and has an upper horizontal run 70ª lengthwise of the upper portion of the frame structure 1 and a lower horizontal run 70ᵇ lengthwise of the lower portion of such structure. In the present instance, the horizontal stringers 4 of the frame structure 1 form upper and lower trough-like runways for the respective upper and lower runs of the conveyor. One of said guide rolls, an idler 71ª, is located inwardly from the uper right guide roll 71 (Fig. 1) and is yieldingly mounted to serve as a tensioning roll for the conveyor 70. Also one of said rolls 71, the lower left in Fig. 1, serves as a drive for the conveyor and is driven from the motor 65 through a belt-and-pulley or chain-and-sprocket wheel connection 72.

Figure 1:
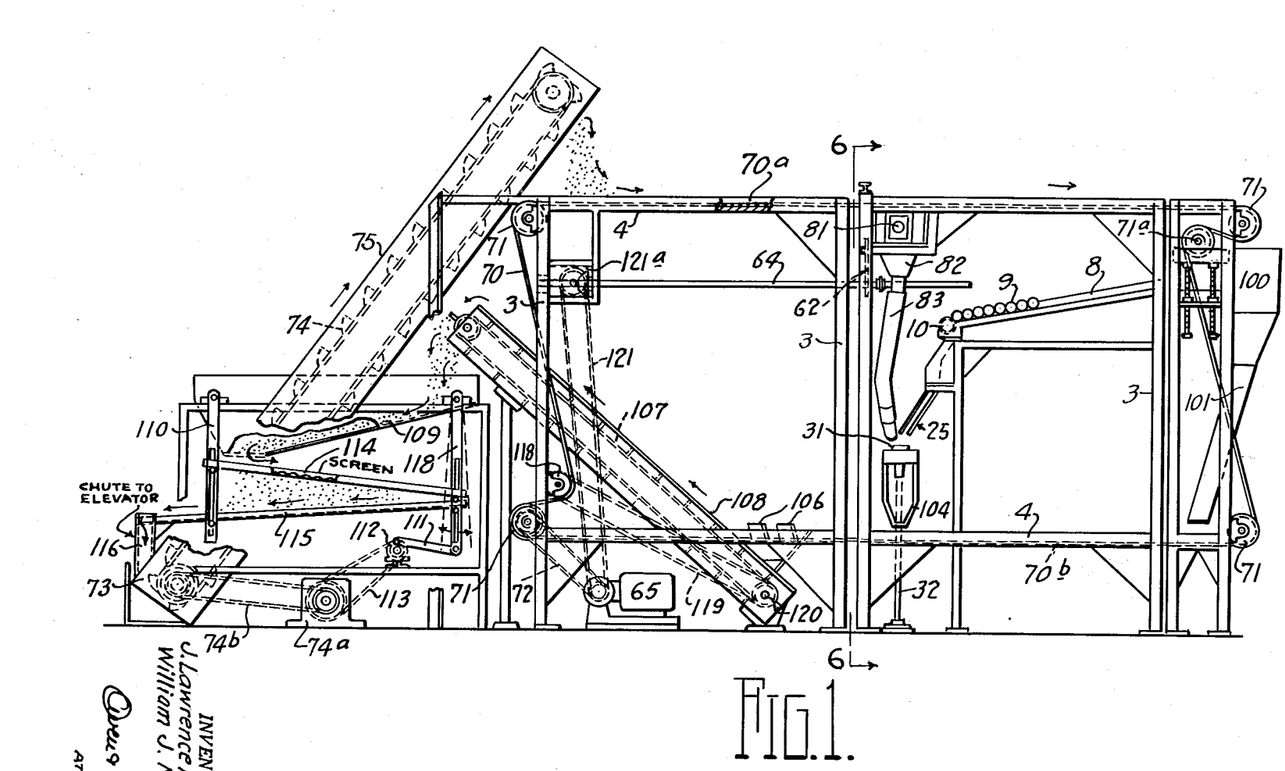
Fig. 1 is a side elevation of an apparatus embodying the invention.
Figure 2:
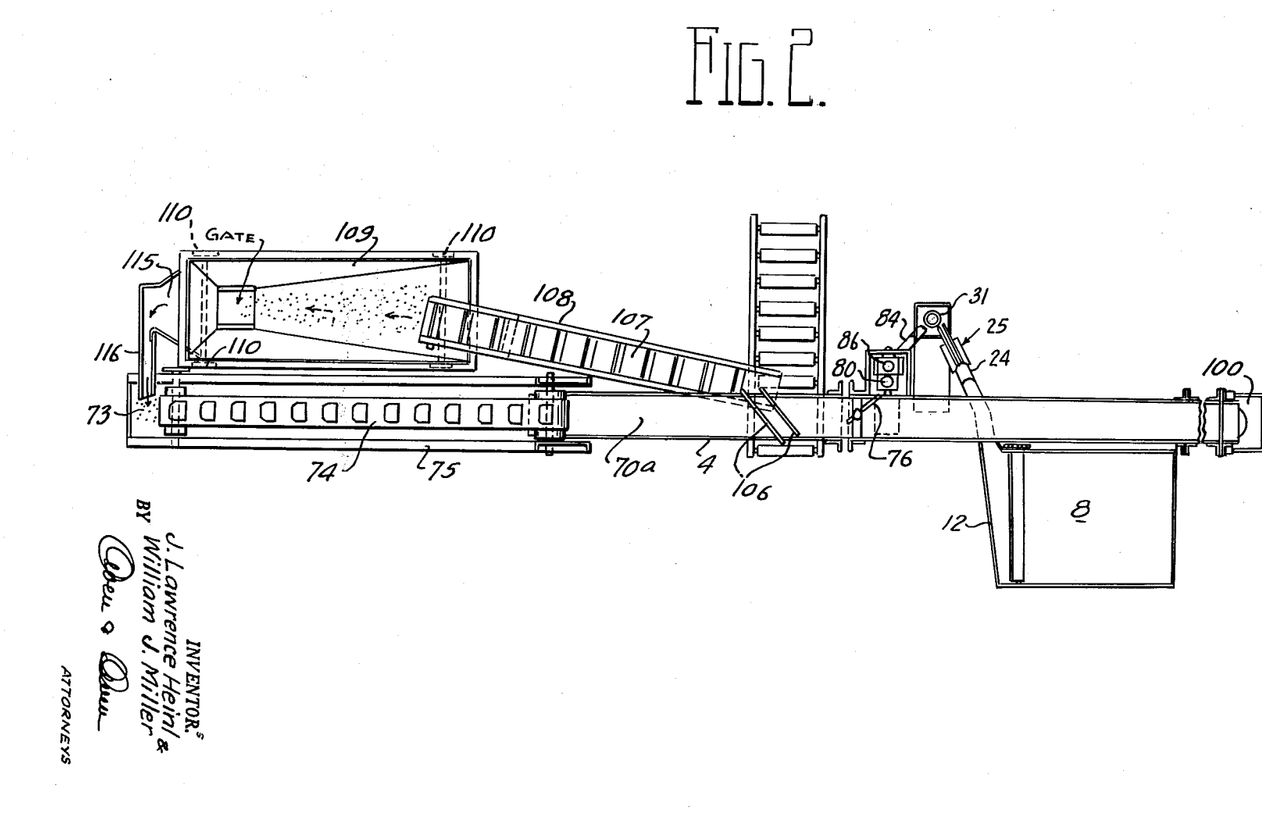
Fig. 2 is a top plan view thereof.

The soil is elevated from a box 73 at the left end of the frame structure 1 (Fig. 1) to the left or rear end of the run 70ª of the conveyor by a bucket type elevator 74 mounted in a frame 75 and driven from a separate motor 74ª by a chain-and-sprocket connection 74ᵇ. The soil delivered to the upper conveyor run 70ª is carried forward thereby to a point above a pot-feeding station and is there scraped and directed, all or partially, by a plow 76 into a measuring chamber 77 (Figs. 2, 6 and 7). The scraper or plow 76 is carried by a frame yoke 78 over the conveyor 70 and is adjustable to cover a desired portion of the conveyor run so that a greater or less quantity of the conveyed soil will be directed into the chamber 77. The adjustment of this scraper means is particularly desirable when said conveyor run is intended to supply more than one pot filling station, as is done in practice. In such case, a predetermined portion of the conveyed soil is discharged into that chamber 77 associated with each filling station.

Figure 5:
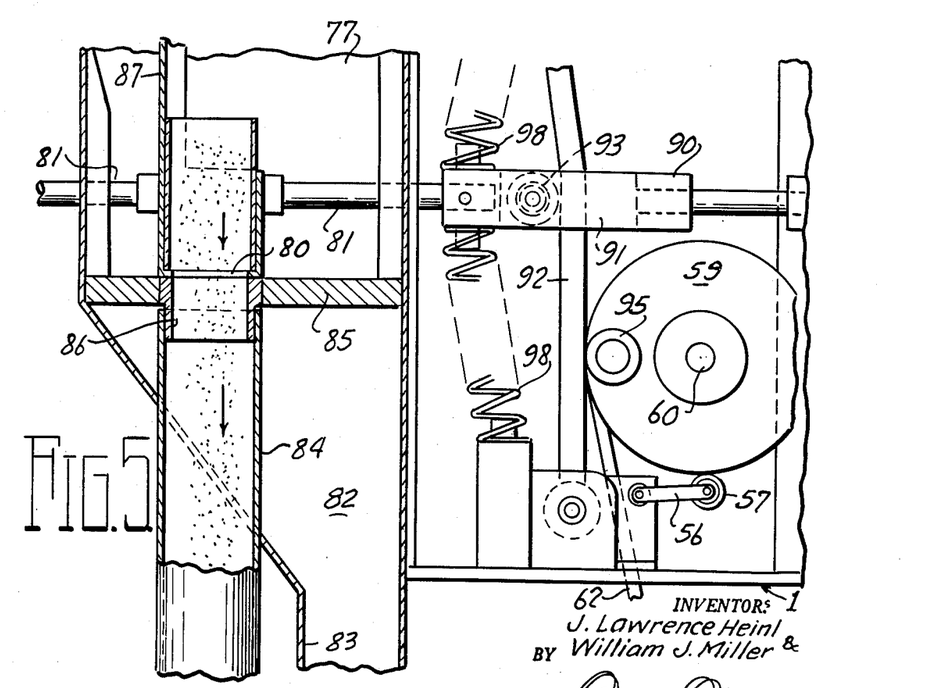
Fig. 5 is a fragmentary view similar to Fig. 3, with the measuring means in soil-discharging position.

A measuring cup or receptacle 80 is disposed in the bottom of the chamber 77 and is carried by a bar 81 for shifting movements therewith from the soil-receiving position shown in Figs. 3 and 4 to the soil-discharging position shown in Fig. 5. This movement is transverse to the conveyor run and surplus soil that falls into the chamber 77 and is not received by the measuring cup passes from the open bottom of said chamber into a chute 82 by which it is directed through a pipe 83 to the top or inner side of the lower run 70$^b$ of the conveyor (Fig. 6).

When the measuring cup 80 is moved to discharging position, its open bottom registers with the upper open end of a pipe 84 by which the discharged soil is directed to a pot 90 positioned in the holder 31. The movement of the cup 80 is on a stationary horizontal plate 85 in the chamber. This plate only partially closes the bottom of said chamber but serves to close the cup bottom when the cup is in receiving position. The plate has an opening 86 in register with the upper end of the pipe 84 and with which the open bottom of the cup registers when it is in discharging position. The cup 80, except at its top and bottom, is enclosed by a box 87 interposed between sections of the bar 81. This bar has an end projecting from the outer side of the housing 88 forming the chamber 77, while its other end projects into the frame part 61 and there has an interposed block 90 reciprocable therewith and forming part of a power operating means for the bar. The bar 81 is mounted for reciprocatory movement in suitable bearings provided in the frame structure.

The block 90 (Figs. 3, 4 and 5) has a longitudinal slot 91 therein through which an operating arm 92 loosely projects and bears at one end of the slot against a roll 93 therein. The arm 92 is pivoted at 94 for rocking movements in a vertical plane and is engaged in opposition to the roll 93 by a roll 95 carried by a side of the cam wheel 50 adjacent to its rim. The arm 92 is normally held at the limit of its movement to the right or away from the roll 93 by a coiled contractile spring 96 that connects the free end of the arm to an adjusting screw 97 attached to the frame 1. The block 90 is engaged by two opposed laterally disposed coiled compression springs 98 that tend to hold the block and attached parts at one limit or the other of their stroke movements when the springs are flexed to one side or the other from neutral or axially aligned positions. This causes said parts to have a spring snap action at both ends of the stroke so as to jar the measuring cup 80 to dislodge the soil therefrom and facilitate its feed therethrough. It is apparent that the roll 95 at each revolution of the wheel 59 engages and moves the arm 92 to the left sufficiently for the action of the springs 98 to complete the left stroke of the measuring cup to place it in discharging position and that the arm 92, under the pulling force of the spring 96, then acts against the right end wall of the slot 91 to return the block 90 and connected parts to an over center position of the springs 98, so that such springs then act to quickly complete the return stroke.

When it is desired to change the quantity of soil delivered to the waiting pot with each movement of the parts above described, it is only necessary to change the measuring cup 80 to a smaller or larger size. The arrangement is such that the various measuring cups are graduated in height, but of uniform diameter since each size must discharge through the same opening 86 in the plate 85 to release the contained soil to the tube 84. It will be apparent that a change in cup size will be required whenever planting begins in a pot of a diameter different than that on which the machine has previously been working.

Any soil remaining on the conveyor 70 at the end of its top run is discharged over the right hand guide pulley 71 into a hopper 100 that has a bottom chute 101 leading down to the point where it has its discharge onto the top surface of the lower run 70$^b$ of the conveyor. Excess soil that may be supplied when filling a pot is also returned to the top surface of said lower run 70$^b$ through a chute 104 that is supported by the standard 32 and has an open mouth surrounding the pot holder 31 in spaced relation thereto, as shown in Fig. 6. It is thus apparent that surplus soil is returned to the top surface of the lower run 70$^b$ of the conveyor through either or all of three sources, the chute 83 from the measuring chamber 77, through chute 101 from the end of the upper run of the conveyor and from chute 104 from around the pot being filled.

The surplus and returned soil is scraped laterally from the lower conveyor run by one or more scrapers 106 and directed thereby onto the elevating run of a conveyor 107 that is mounted in a frame 108 at a side of the lower conveyor run 70$^b$. The elevator 107 raises such surplus soil to a point where it is discharged into a large receiving bin member 109 that is elevated above the level of the box 73. The bottom of this bin 109 slopes downwardly and terminates in position so that the discharge from its left end is into a sideways sloping trough 116. The bin 109 is mounted for vibratory movements and such movements are imparted thereto from the motor 74$^a$. The bin 109, in the present instance, is supported by a set of rocker arms 110 and one of these arms is connected by a link 111 to an eccentric 112 driven by a belt 113 from the motor 74$^a$ whereby rotation of the eccentric imparts agitation to the bin to facilitate feed of the soil down its inclined bottom. The discharge from the lower end of the bin is onto an oppositely inclined subjacent screen 14 through which the usable soil passes to a subjacent imperforate feed plate member 115. Anything in the soil too coarse to pass through the mesh of the screen 114 is discharged from its lower end while the soil that is sifted down onto the plate 115 is discharged from its lower end into an inclined transverse trough 116 by which it is directed into the box 73 from which the elevator 74 receives its supply. The screen 114 and feed plate 115 are carried by the rocker arms 110 to have movement therewith, and the trough 116 is fixed to the plate 115 to move in unison therewith.

The movement of the conveyor 70 drives a roll 118 the shaft of which is journaled crosswise in the frame structure 1 and has sprocket wheel and chain or other suitable connection 119 with the lower drive shaft 120 for the elevator 107. The connection for driving the line shaft 64 is direct from the motor 65 and is indicated at 121 (Fig. 1). This connection includes a speed control connection, indicated at 121$^a$, with the shaft 64.

In the operation of the machine, the attendant is stationed at the far side of the machine (Figs. 1 and 2) adjacent to the pot holder 31. The operation of the soil conveying means is then commenced by starting the motors 65 and 74$^a$, the former operating to run the conveyor belt 70 and the elevating conveyor 107, while the motor 74$^a$ operates the eccentric 112 to shake the soil-receiving bin or hopper 109, as well as the screen 114 and feed plate 115 both attached thereto, so that the soil is fed from the bin 109 to the screen 14 where separation of the coarse or foreign particles is obtained and the finer soil screened onto the plate 115 and down which it passes into the trough 116 and into the feed box 73 for the elevating conveyor 74. This latter conveyor elevates the soil and deposits it in substantially a continuous stream on the receiving end portion of the upper run 70$^a$ of the conveyor belt 70. As the conveyor 70 feeds forward, a predetermined portion of the soil on the top run 70$^a$ is engaged by the plow or deflecting member 76 and flowed into the chamber 77, a portion of the soil falling therein being collected by the measuring cup 80 which is then in its forward or soil-receiving position, as shown in Figs. 4 and 6. The overflow soil from the measuring cup 80, or that which falls to the bottom of the chamber 77 around the cup, passes immediately from the chamber through the hopper 82 and chute 83 to a point where it is delivered to the lower run 70b of the conveyor 70, as illustrated in Fig. 6.

When a pot is in position on the support 31, the operator pulls the handle 38, thus moving the idler sheave 66 to tighten the belt 62 and cause the cam wheel 59 to be rotated from the continuously driven shaft 64, which in turn is driven, in the present instance, from the motor 65. As the cam wheel 59 turns, the roller first acts against the arm 92 to move the shaft 81 to the left (Figs. 3, 4 and 5), thus shifting the attached measuring cup 80 from wheel-receiving to soil-discharging position over the chute 84. The discharge of soil from the cup is facilitated by the snap action of the shaft movement that is caused by the over-center action of the springs 98. The soil discharged into the conduit 84 is delivered to the pot in the support 31, thus filling it the desired extent. When the cup has discharged its contents and the roller 95 has moved past its point of engagement with the arm 92, such arm is returned to its normal right hand position by the action of the spring 96 and this return movement first moves the shaft 81 past center with respect to the springs 98, so that the springs may then act to quickly finish the right hand or return movement of the shaft and its block 90. The cam 59 turns slowly and when it has nearly completed a revolution the cam member 58 strikes the roller 57 on the switch arm 56 and closes the switch 55. During the interim between the filling of the receiving pot and the closing of the switch 55, the operator has had time to set a plant in the pot, tamp the soil therearound and then to remove the pot with the plant therein to a convenient position before the next pot has been fed to filling and planting position. The pots, after being filled, may be placed in a receiving tray, which when filled may be transferred to any suitable point for storage or other disposition. The closing of the switch 55 by the action of the cam wheel 59 causes an energizing of the solenoid 39 to move its core or plunger 38 outward.

The successive feeding of pots 9 to soil-receiving position on the support 31 is automatically effected as follows. If there are no pots on the delivery chute 27, the operator gives the crank 21 a single turn which imparts a single rotation to the magazine 10 to deliver a column of pots 9 from the supply table to the trough 12. As the column of pots drops from the magazine 10, its right end strikes the bottom of the trough 12 while its left end strikes and is held momentarily supported by the bracket 13, thus imparting a sudden flexing of the pot column to loosen the pots therein. Immediately after turning the crank 21, the operator depresses the pedal 18 which moves the bracket 13 from pot-supporting position and permits the column to fall into the trough 12 and to feed endwise down the same by gravity to the chute 28. The movement of the column of pots down the guide rail 27 of the chute is arrested by engagement of the forward pot with the stop 50 on the rocker arm 51. The position of stopping is such that the rim of the second pot in order is in register with the clamp 43, so that when the clamp is lowered it will engage the rim of the second pot and hold it stationary during the subsequent feeding of the forward pot from the column. When the solenoid switch 55 has been closed by engagement of the cam member 58 with the switch arm, the solenoid is energized to move the clamp 43 to pot-clamping position and to simultaneously move the stop 50 out of stop engagement with the first pot and to move the arm 35 and its ejector finger 30 forward. The ejector finger in its forward movement engages the rim edge of the first pot and both separates it from the second or clamped pot and directs its movement down the guide rails 27 so as to discharge therefrom into the pot support 31. Upon the ejection of the foremost pot, the solenoid control switch opens, thus permitting a return of the stop 50, the clamp 43 and the ejector finger 30 to their normal positions, as shown in Fig. 9.

Rotation of the line shaft 64 is continuous, but each potting station operates to feed pots and soil successively only so long as a driving engagement is established, as by tightening idler pulley 66 so that belt 62 will rotate the cam wheel 56 and continue to move the soil delivery means and to close the circuit to the solenoid in the pot feeding device. Whenever a particular station is to be shut down, either for an operator rest period or to adjust the parts to fill pots of different size, the operator need only release the idler pulley 66. The remainder of the potting stations will continue to operate from the line shaft 64 in an uninterrupted manner.

When the operator notices that the column of pots in the delivery chute 27 is running low, a single turn of the crank 21 and a single depression of the pedal 18 will bring down another column to renew the supply. It is not necessary for the operator to completely use a full column before bringing the next succeeding column into position.

What we claim is:

1. In a machine of the class described, means for supporting a pot in position to be filled, mechanism for intermittently delivering pots to said position, mechanism for conveying and delivering a quantity of soil to each pot positioned on said first means and including a measuring station and a means for effecting substantially continuous feed of soil to said station, means for operating said pot delivering mechanism and said soil conveying, measuring and delivering mechanism in predetermined synchronized relation, a screening means, and separate means for delivering surplus or overflow soil from both said pot-filling means and said measuring mechanism to said screening means to condition it for reuse.

2. In a machine of the class described, an endless belt type conveyor, means guiding said conveyor to provide a substantially horizontal run, a source of soil supply, means for feeding soil to the top of the said conveyor run from said source to supply a substantially continuous stream of soil to the top of said conveyor run, a measuring chamber to which at least a portion of said conveyor fed soil is discharged, movable measuring means in said chamber for receiving at least a portion of the soil discharged therein, means for moving the measuring means from receiving to discharging positions, and means for directing the contents of the measuring means when in discharging position to a predetermined point, means for directing surplus soil in the chamber back to said stream, and means to move a receiving pot into position at said predetermined point before each movement.

3. A combination as called for in claim 2 wherein the moving means for the measuring means is mechanically operated to move the measuring means in both stroke directions and quickly stop each stroke movement to impart a jarring action to the associated parts.

4. In a combination of the class described, an endless belt type conveyor, means guiding the conveyor to provide substantially horizontal upper and lower runs, a soil source, means for feeding soil from said source to said upper run, a soil measuring station having a measured soil discharge conduit and a surplus soil discharge conduit leading therefrom, the discharge of said last conduit being onto the top of said lower conveyor run, at least a portion of the soil on said upper run having its discharge into said station, a soil measuring unit movable in said station between a position where it is filled by the soil discharged therein and a position where its discharge is into said first conduit, and means disposed at a predetermined point in said lower run for receiving the soil carried thereby and delivering it to a predetermined point.

5. A combination as called for in claim 4 together with means for supporting a pot in position to be filled by the discharge from said measured soil discharging conduit.

6. A combination as called for in claim 5 together with means for catching and directing any surplus or pot overflow soil from said pot filling position to a predetermined point of discharge.

7. A combination as called for in claim 6 wherein said last-mentioned means directs its surplus or overflow soil discharge onto the lower run of said conveyor, and means to subsequently return said soil to said supply source.

8. A combination as called for in claim 4, and means to return soil from said lower conveyor run to said supply source.

9. In a machine of the class described, an endless belt type conveyor having a substantially horizontal run, a soil source, means for delivering soil from said source to the top of said conveyor run whereby a substantially continuous stream of soil is fed forward by said run, a support where pots to be filled may be successively placed, a measuring chamber having two spaced discharge openings in its bottom, a conduit for directing the discharge from one of said openings to pot filling position on said support, the other of said openings being for surplus soil discharge, a measuring cup in said chamber movable from filling position adjacent to said surplus discharge opening to discharging position over said other opening, the cup bottom being closed except when over the opening to said discharge conduit, means for moving the measuring cup from one position to the other, and means for diverting at least a portion of the soil column from said conveyor run to said chamber to fall into and fill the measuring cup when in receiving position with the remainder of such diverted soil passing from the chamber to said surplus discharge opening.

10. In a machine of the class described, a pot feeding mechanism comprising a support for a plurality of columns of nested pots, a guideway in advance of said support down which pot columns may move to a predetermined position, means for successively feeding said pot columns to the upper end of said guideway from said support, and means interposed between said support and said guideway to effect a transverse flexing of a pot column to loosen the pots in each column as it is fed to said guideway.

11. In a machine of the class described, a pot feeding mechanism comprising a support for a plurality of parallel columns of nested pots, a guideway in advance of said support for feeding successive columns of pots endwise to a predetermined point, means for transversely transferring successive pot columns from the support to said guideway and during such transfer causing a sudden momentary stopping of the feeding movement of the end portions of the column to flex the column and loosen the pots therein.

12. In a machine of the class described, a pot feeding mechanism comprising a forwardly and downwardly inclined support down which a plurality of successive parallel columns of nested pots may feed, a guideway in advance of said support for receiving pot columns from the support and directing them endwise to a predetermined point, means for separating each advancing pot column from those remaining on the support and delivering it to the guideway and effecting a sudden transverse flexing thereof to loosen the nested condition of the pots before the entire column reaches the guideway.

13. A combination as called for in claim 11 wherein said last means includes a rotatable tubular magazine having a side opening through which a pot column enters and discharges at different points in a rotation of the magazine, and means for rotating the magazine.

14. In a machine of the class described, an endless belt type conveyor having a substantially horizontal run, means for driving said conveyor, means for supplying soil to the top of said conveyor run in substantially a continuous stream, a chamber to which soil is delivered in a substantially continuous stream by said conveyor run, said chamber having a receiving portion and a discharging portion, a conduit leading from the bottom of each of said chamber portions to separate predetermined points of discharge, a measuring cup in said receiving chamber portion to be filled by the discharge of soil into the chamber, said cup being movable to and from receiving and discharging positions of the chamber and when in receiving position having its bottom closed and when in discharging position having its bottom open to the discharge conduit from said position, said other discharge conduit serving to discharge from the chamber soil other than that received by the measuring cup.

15. A combination as called for in claim 14 together with means operable to move the measuring cup from receiving to discharging position in said chamber and return.

16. A combination as called for in claim 15 wherein said means has a snap action at the end of each measuring cup movement to jar the soil measuring and discharge parts.

17. A combination as called for in claim 15 wherein said means comprises a reciprocally movable member attached to the measuring cup for shifting movements therewith, spring means for imparting a snap movement to said member in either direction of movement past a neutral position, and means operable to impart successive movements to said member in first one direction and then the other past neutral position.

References Cited in the file of this patent

UNITED STATES PATENTS

| | | |
|---|---|---|
| 934,118 | Wild, Jr. | Sept. 14, 1909 |
| 1,306,447 | Stepanoff | June 10, 1919 |
| 2,003,417 | Andreas | June 4, 1935 |
| 2,029,299 | Anderson | Feb. 4, 1936 |
| 2,108,301 | Taylor | Feb. 15, 1938 |
| 2,536,516 | Peterson | Jan. 2, 1951 |
| 2,553,250 | Gross | May 15, 1951 |
| 2,621,844 | McBean et al. | Dec. 16, 1952 |
| 2,696,776 | McBean et al. | Dec. 14, 1954 |

FOREIGN PATENTS

| | | |
|---|---|---|
| 419,239 | Great Britain | Nov. 8, 1934 |